US012566580B2

(12) United States Patent
     Wang

(10) Patent No.: US 12,566,580 B2
(45) Date of Patent: Mar. 3, 2026

(54) HOLOGRAPHIC PROJECTION SYSTEM, METHOD FOR PROCESSING HOLOGRAPHIC PROJECTION IMAGE, AND RELATED APPARATUS

(71) Applicant: Beijing Baidu Netcom Science Technology Co., Ltd., Beijing (CN)

(72) Inventor: Zhongyi Wang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 238 days.

(21) Appl. No.: 17/948,478

(22) Filed: Sep. 20, 2022

(65) Prior Publication Data

US 2023/0011253 A1      Jan. 12, 2023

Related U.S. Application Data

(63) Continuation of application No. PCT/CN2021/136773, filed on Dec. 9, 2021.

(30) Foreign Application Priority Data

May 25, 2021      (CN) .......................... 202110572126.6

(51) Int. Cl.
     *G06F 3/14*          (2006.01)
     *G03H 1/22*          (2006.01)
                          (Continued)

(52) U.S. Cl.
     CPC ............. *G06F 3/14* (2013.01); *G03H 1/2294* (2013.01); *G06T 5/50* (2013.01); *H04B 5/20* (2024.01);
                          (Continued)

(58) Field of Classification Search
     None
     See application file for complete search history.

(56) References Cited

U.S. PATENT DOCUMENTS

2015/0314202 A1    11/2015   Shimohata
2015/0371531 A1*   12/2015   Wang ..................... G08C 17/02
                                                          340/12.54
                          (Continued)

FOREIGN PATENT DOCUMENTS

CN          111127998 A        5/2020
CN          211090475 U    *   7/2020
                          (Continued)

OTHER PUBLICATIONS

International Search Report of International Patent Application No. PCT/CN2021/136773, mailed Mar. 9, 2022; English translation unavailable (5 pages).

*Primary Examiner* — Kyle Zhai
(74) *Attorney, Agent, or Firm* — ICE MILLER LLP; Justin D. Swindells

(57)          ABSTRACT

A holographic projection system, a method and apparatus for processing a holographic projection image, an electronic device, a computer readable storage medium, and a computer program product are provided. The system includes a near field communication information storage, for storing image content configuration information readable a by near field communication mechanism; and a holographic projection body provided with a near field communication scanner, for reading the image content configuration information in the near field communication information memory through the near field communication scanner and presenting a holographic projection corresponding to the image content configuration information.

13 Claims, 2 Drawing Sheets

100

102

101

(51) Int. Cl.
    *G06T 5/50*         (2006.01)
    *H04B 5/20*         (2024.01)

(52) U.S. Cl.
    CPC ................... *G03H 2226/04* (2013.01); *G06T 2207/20221* (2013.01)

(56)                 References Cited

U.S. PATENT DOCUMENTS

| | | | |
|---|---|---|---|
| 2016/0040983 A1* | 2/2016 | Lee | G03H 1/2249 |
| | | | 356/601 |
| 2016/0236079 A1 | 8/2016 | Lin | |
| 2016/0352380 A1* | 12/2016 | Kovacs | A45F 5/00 |
| 2018/0276713 A1* | 9/2018 | Nozawa | H04B 5/77 |
| 2021/0208764 A1 | 7/2021 | Xing | |
| 2021/0263469 A1* | 8/2021 | Seo | H04N 13/117 |
| 2022/0245645 A1* | 8/2022 | Grant | G06F 21/32 |

FOREIGN PATENT DOCUMENTS

| | | | |
|---|---|---|---|
| CN | 212522989 U | 2/2021 | |
| CN | 113505616 A | 10/2021 | |
| JP | 2018513701 A | 5/2018 | |
| KR | 10-2013-0022619 A | 3/2013 | |
| KR | 10-1655399 B1 | 9/2016 | |
| WO | WO 2014/189840 A1 | 11/2014 | |

* cited by examiner

100

101

100

1021

1022

1023

101

103

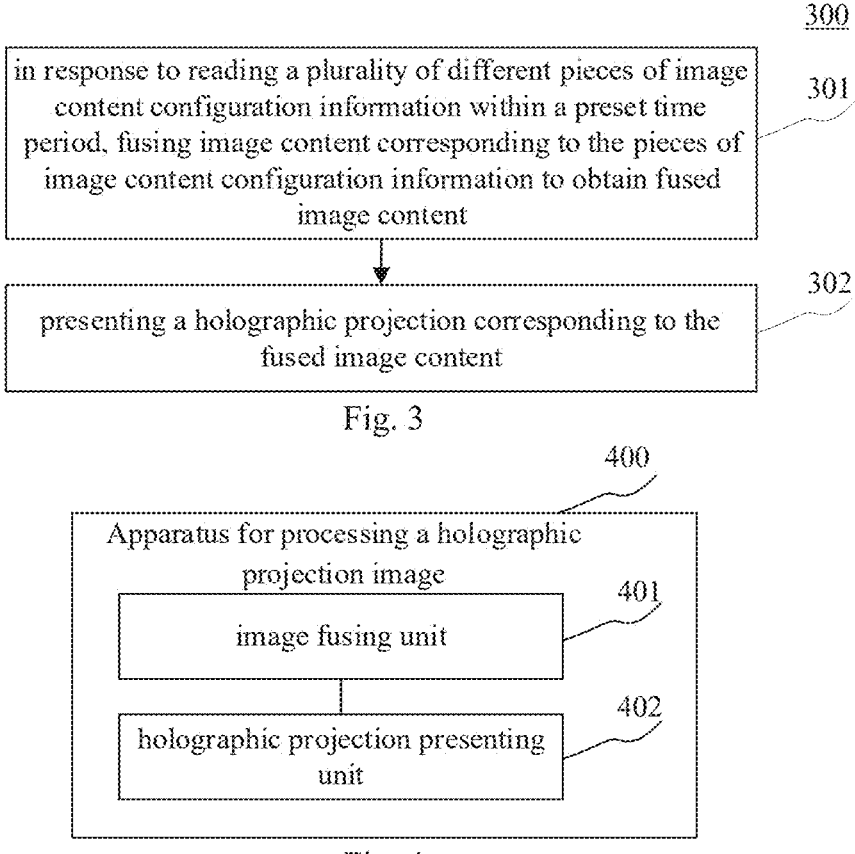
Fig. 3
Fig. 4
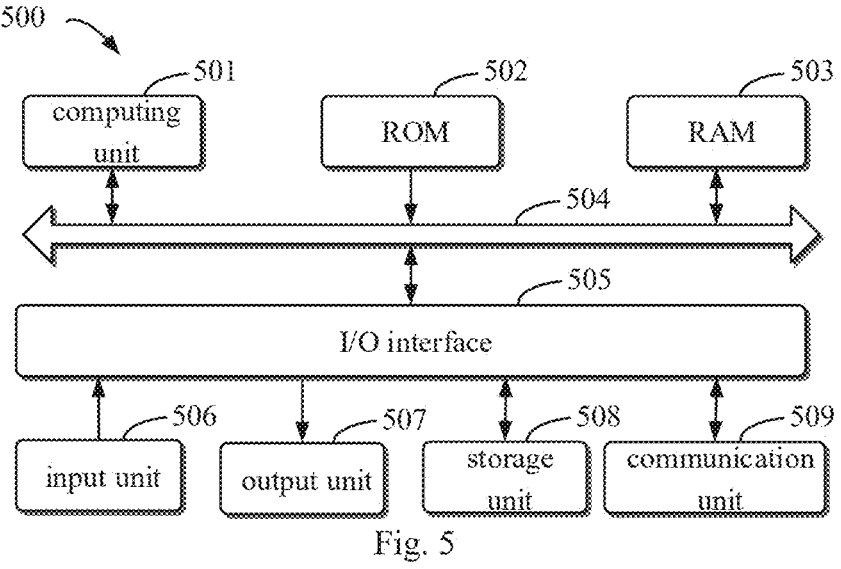
Fig. 5

HOLOGRAPHIC PROJECTION SYSTEM, METHOD FOR PROCESSING HOLOGRAPHIC PROJECTION IMAGE, AND RELATED APPARATUS

CROSS-REFERENCE TO RELATED APPLICATIONS

The present application is a continuation of International Application No. PCT/CN2021/136773, filed on Dec. 9, 2021, which claims the priority of Chinese Patent Application No. 202110572126.6, titled "HOLOGRAPHIC PROJECTION SYSTEM, METHOD FOR PROCESSING HOLOGRAPHIC PROJECTION IMAGE, AND RELATED APPARATUS", filed on May 25, 2021. Both of the aforementioned applications are hereby incorporated by reference in their entireties.

TECHNICAL FIELD

The present disclosure relates to image processing technologies, particularly, to the field of holographic projection and near field communication, and more particularly, to a holographic projection system, a method and apparatus for processing a holographic projection image, an electronic device, a computer readable storage medium, and a computer program product.

BACKGROUND

Human-machine interaction in existing intelligent devices is often relatively simple, for example, all by means of speech, and for another example, all by means of function keys.

How to further enrich interaction modes between a user and an intelligent device and improve an interaction efficiency are research focuses for a person skilled in this field.

SUMMARY

Embodiments of the present disclosure provide a holographic projection system, a method and apparatus for processing a holographic projection image, an electronic device, a computer readable storage medium, and a computer program product.

Some embodiments of the present disclosure provide a holographic projection system, including a near field communication information storage, for storing image content configuration information readable by a near field communication mechanism; and a holographic projection body provided with a near field communication scanner, for reading the image content configuration information in the near field communication information memory through the near field communication scanner and presenting a holographic projection corresponding to the image content configuration information.

Some embodiments of the present disclosure provide a method for processing a holographic projection image applied to a holographic projection body of the holographic projection system described in any implementation of the first aspect, including: in response to reading a plurality of different pieces of image content configuration information within a preset time period, fusing image content corresponding to the different pieces of image content configuration information to obtain fused image content; and presenting holographic projection corresponding to the fused image content.

Some embodiments of the present disclosure provide an apparatus for processing a holographic projection image applied to a holographic projection body of the holographic projection system described in any implementation of the first aspect, including an image fusing unit configured to, in response to reading a plurality of different pieces of image content configuration information within a preset time period, fuse image content corresponding to the different pieces of image content configuration information to obtain fused image content; and a holographic projection presenting unit configured to present a holographic projection corresponding to the fused image content.

Some embodiments of the present disclosure provide an electronic device including: at least one processor; and a memory communicatively connected to the at least one processor; where the memory stores instructions executable by the at least one processor, and the instructions are executed by the at least one processor, such that the at least one processor can execute the above method for processing a holographic projection image.

Some embodiments of the present disclosure provide a non-transitory computer readable storage medium storing computer instructions, where the computer instructions are used for causing a computer to execute the above method for processing a holographic projection image.

Some embodiments of the present disclosure provide a computer program product including a computer program, where the computer program, when executed by a processor, implements the above method for processing a holographic projection image.

A holographic projection system according to an embodiment of the present disclosure includes: a near field communication information memory used for storing image content configuration information readable by a near field communication mechanism; a holographic projection body provided with a near field communication scanner, used for reading the image content configuration information in the near field communication information memory through the near field communication scanner and presenting a holographic projection corresponding to the image content configuration information.

It is to be understood that the description in this section is not intended to identify key or critical features of the embodiments of the disclosure, nor is it intended to limit the scope of the disclosure. Other features of the present disclosure will become readily apparent from the following description.

BRIEF DESCRIPTION OF THE DRAWINGS

Other features, objects, and advantages of the present disclosure will become more apparent by reading the detailed description of non-limiting embodiments made with reference to the following drawings:

FIG. 3 is a flowchart of a method for processing a holographic projection image according to an embodiment of the present disclosure;

FIG. 4 is a structural block diagram of an apparatus for processing a holographic projection image according to an embodiment of the present disclosure; and FIG. 5 is a schematic structural diagram of an electronic device adapted for implementing a method for processing a holographic projection image according to an embodiment of the present disclosure.

DETAILED DESCRIPTION OF EMBODIMENTS

Figures 1, 2:
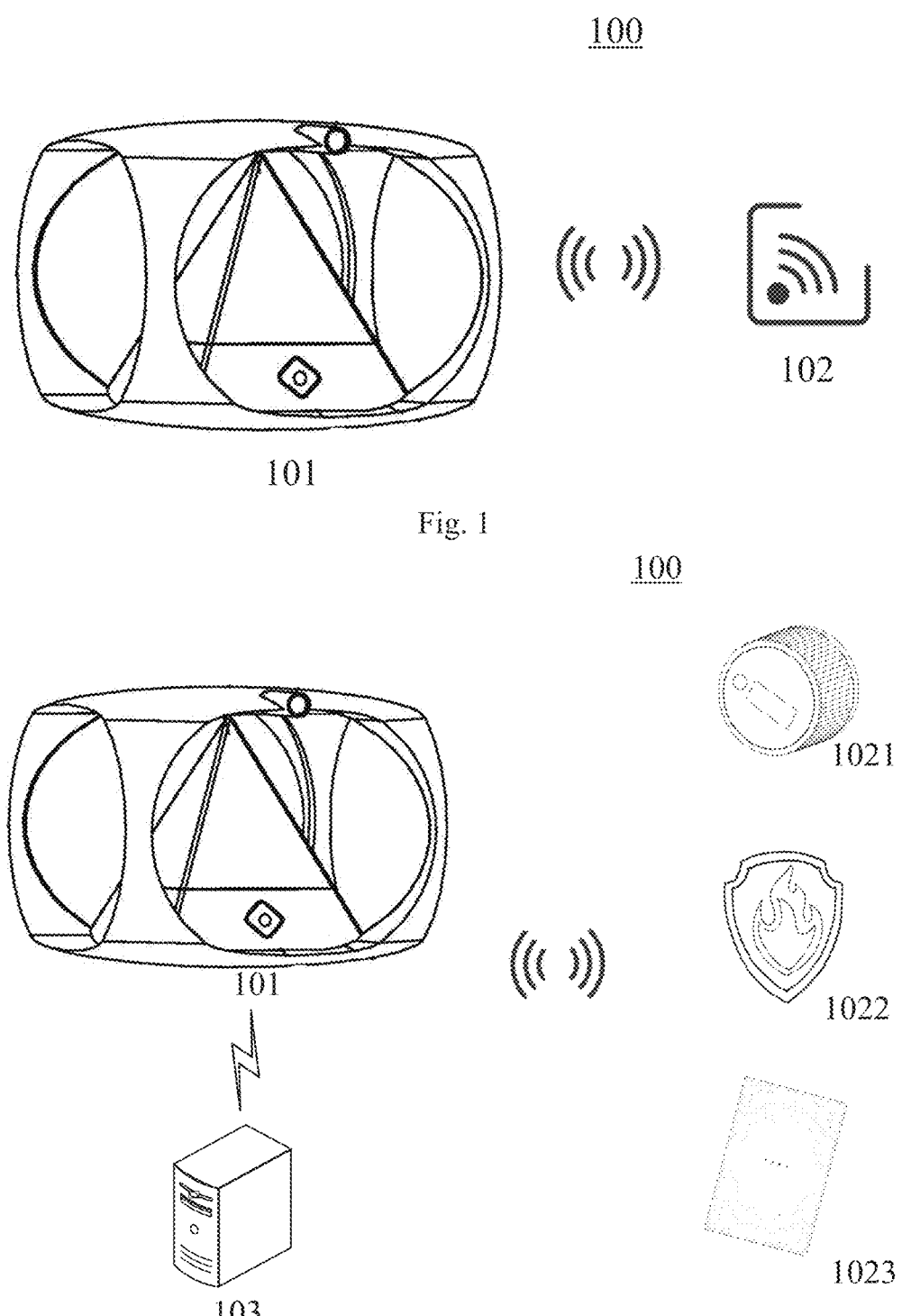
FIG. 1 is a schematic structural diagram of a holographic projection system according to an embodiment of the present disclosure.
FIG. 2 is an exemplary schematic diagram of another holographic projection system according to an embodiment of the present disclosure.

The following description of exemplary embodiments of the present disclosure, taken in conjunction with the accompanying drawings, includes various details of embodiments of the present disclosure to facilitate understanding, and is to be considered as exemplary only. Accordingly, one of ordinary skill in the art will recognize that various changes and modifications may be made to the embodiments described herein without departing from the scope and spirit of the disclosure. Also, for clarity and conciseness, descriptions of well-known functions and structures are omitted from the following description. It is noted that the embodiments in the present disclosure and the features in the embodiments may be combined with each other without conflict.

In the technical solution of the present disclosure, the acquisition, storage and application of the user's personal information are all in accordance with the provisions of the relevant laws and regulations, and necessary security measures are taken without violating the public order and good customs.

FIG. 1 shows a schematic structural diagram 100 of a holographic projection system.

The structure diagram 100 includes a holographic projection body 101 and a near field communication information memory 102. The near field communication information memory 102 is configured to store image content configuration information that can be read by a near field communication mechanism. The holographic projection body 101 is provided with a near-field communication scanner, and is used for reading the image content configuration information in the near-field communication information memory through the near-field communication scanner and presenting a holographic projection corresponding to the image content configuration information.

The image content configuration information is configuration information for instructing the holographic projection body 101 to present the holographic projection of corresponding image content. For example, when the image content to be presented is a game character A, then corresponding image content configuration information may be a set of information such as a three-dimensional structure diagram and a color distribution scheme of the game character A, so that the holographic projection body 101 presents the holographic projection of the game character A. Of course, a type of the image content is not limited to a character image, but may be a landscape image, a building, a virtual object, or the like, and the presented image content is not limited to be static, but may also be an associated dynamic image.

Taking a dynamic human character as an example, it is possible to control an action of the human character to correspond to an external instruction received by the holographic projection body 101 or a preset instruction triggered by the holographic projection body 101 by a timing manner in various ways. For example, in response to receiving a "waving" instruction, the human character may make a corresponding "waving" action. In response to receiving a "hello" instruction, the human character may also invoke a sounding component while make a corresponding mouth shape for saying "hello".

In addition, considering that an information storage capacity of the near field communication information memory 102 is generally relatively small, if a data amount of the specific image content configuration information is large and exceeds an effective storage upper limit of the near field communication information memory 101, it is also possible to control to only store an index or a link for further querying the specific image content configuration information the in near field communication information memory 102, to serve as "dummy image content configuration information" capable of assisting in obtaining real image content configuration information.

Near field communication (Near Field Communication, NFC for short) is an emerging technology. Devices (such as mobile phones) applying the NFC technology can exchange data when they are close to each other. The technology is developed by integrating a contactless radio frequency identification (RFID) and an interconnection technology. By integrating functions of an inductive card reader, an inductive card, and point-to-point communication on a single chip, a mobile terminal is used to implement applications such as mobile payment, electronic ticketing, access control, mobile identification, and anti-counterfeiting. In addition to the NFC by means of the RFID, technologies (such as infrared, Bluetooth, and the like) in which data exchange can be performed in a close distance also belong to the near field communication. Compared with Bluetooth and infrared, an NFC chip-based near field communication mode has a relatively low cost. In this case, the near field communication information memory is a near field communication chip (NFC chip) in which the image content configuration information is stored.

In the present disclosure, the near field communication technology is used in the field of holographic projection. By means of a near field communication information memory in which the image content configuration information is stored independently, the image content of the holographic projection presented by the holographic projection body is conveniently adjusted, so as to improve interestingness and playability.

Specifically, the holographic projection body 101 may be embodied as a holographic projection apparatus without other functions, or may be embodied as an intelligent sound box, an intelligent mobile terminal, or the like integrated with a holographic projection function component.

According to the holographic projection system provided in the present embodiment, the image content configuration information is independently stored in the near field communication information memory, so that the holographic projection body can read the image content configuration information across the air through the near-field identification mechanism, and then presents the corresponding holographic projection according to the image content configuration information. A flexible change of the holographic projection image can be realized by changing the memories storing different image content configuration information.

On the basis of the above-described embodiment, the present disclosure also provides a schematic diagram of another holographic projection system through FIG. 2.

As shown in FIG. 2, considering an availability of the near field communication information memory, various carriers are also provided for the near field communication information memory, for example, a bottle cap 1021, a badge 1022, and a card 1023 shown in FIG. 2. Taking an NFC chip used as a specific near field communication information memory as an example, the NFC chip in which the image content configuration information is stored may be embedded in the bottle cap 1021, the badge 1022, or the card 1023 to protect data stored in the NFC chip by means of a carrier having a larger surface area and more robust material properties. In addition to several smaller carriers, such as bottle caps, badges, cards, and medals, a number of larger carriers, such as toys, boxes, bases, and the like, may be selected. Sizes and shapes of the carriers are not limited herein, and can be flexibly selected according to actual requirements.

It should be noted that when the near field communication information memory is specifically embodied as an NFC chip, information therein can be read from the NFC chip by a corresponding scanner without supplying power to the NFC chip. Therefore, a corresponding power supply component does not need to be provided in a corresponding carrier. However, if the technology used in the near field communication information memory is a technology such as Bluetooth or infrared, a corresponding power supply component needs to be added in combination with actual requirements.

In FIG. 2, an image content storage server 103 is additionally provided, which is communicatively connected with the holographic projection body 101 for returning target image content data corresponding to a download request of the holographic projection body. That is, the image content storage server 103 functions to, when the holographic projection body cannot directly read complete configuration information for presenting the holographic projection of the image content from the near field communication information memory 102, acquire real and complete image content configuration information from the "dummy image content configuration information" and further present the corresponding holographic projection according to the received target image content data.

On the basis of any of the above embodiments, in order to store the near-field communication information memory 102 and maintain a desired near-field communication distance, the holographic projection body 101 may be provided with an opening for holding, accommodating or wrapping the near-field communication information memory 102. The opening has a shape corresponding to a shape of the carrier in which the near-field communication information memory 102 is embedded. For example, when the carrier of the near field communication information memory 102 is a coin-like plastic medal, the holographic projection body 101 may be provided with a coin-like grid to hold the coin-like plastic medal, or may be provided with an internal space for the coin-like plastic medal, or the like.

In addition to the above-described opening-type design, the near field communication information memory 102 may be attached to an outer surface of the holographic projection body 101 by magnetic attraction. That is, different magnetic poles that can attract each other may be provided on the holographic projection body 101 and the near field communication information memory 102, respectively, so that the near-field communication information memory 102 is attached to the outer surface of the holographic projection body 101 by a magnetic force. The near field communication information memory 102 may be attached to the inside of the holographic projection body 101 depending on setting positions of the magnetic poles.

On the basis of any of the above embodiments, to avoid a configuration information reading interference caused by the co-existence of a plurality of near-field communication information memories 102 at the near-field communication distance, a shielding storage box (not shown in both FIG. 1 and FIG. 2) may be provided on the holographic projection body 101, which is used to block the near-field communication scanner from reading the image content configuration information stored in the near-field communication information memory inside the box. For example, the shielding storage box is manufactured by using a specific material or a specific weaving method of a material that can block signal transmission.

The previous embodiment for providing the shielding storage box is directed to a scenario in which only configuration information in one near field communication information memory 102 is read at the near field communication distance. That is, a capacity of processing different configuration information read from different near field communication information memories 102, respectively is not supported in this scenario. However, in certain scenarios supporting the capacity of processing different configuration information read from different near field communication information memories 102, different image content configuration information read from different near field communication information memories 102, respectively, may be fused to obtain fused image content.

For example, if image content configuration information stored in a first near field communication information memory corresponds to an unarmed game character A, and image content configuration information stored in a second near field communication information memory corresponds to a "sword", then a fusion mechanism may be used such that the game character A holds the "sword" in one hand, and auxiliary content of characters, such as an image background, armors, and ridings, is processed similarly. If the image content configuration information stored in the second near field communication information memory corresponds to a game character B, then a fusion mechanism may be used to present an image in which the game characters A and B are both presented. That is, the fusion mechanism can be adaptively adjusted according to a type of image content to be fused. There may also be a number of different specific fusion modes for the image content of a specified type, which may be selected according to an instruction from the user or according to a preset parameter, so as to sufficiently improve the interestingness.

Referring to a flow chart of a specific implementation shown in FIG. 3, FIG. 3 is a flow chart of a method for processing a holographic projection image according to an embodiment of the present disclosure. The flow 300 includes the following step 301 to 302.

Step 301: in response to reading a plurality of different pieces of image content configuration information within a preset time period, fusing image content corresponding to the pieces of image content configuration information to obtain fused image content.

This step is directed to, by an execution body of the method for processing a holographic projection image (for example, the holographic projection body 101 shown in FIG. 1), read a plurality of different pieces of image content configuration information within a preset time period and fuse image content corresponding to the plurality of different pieces of image configuration information.

The plurality of different pieces of image content configuration information are generally respectively from different near field communication information memories 102, without excluding a special case in which the plurality of different pieces of image content configuration information are stored in one near field communication information memory 102. The preset time period may be set to 5 seconds, 10 seconds, or a user-defined time period. Alternatively, different preset time periods may be set in advance, and a fusion mechanism may be set according to a time interval between a current reading time and a reading time of a previous piece of image content configuration information. For example, when the reading interval of two different game characters is within 5 seconds, the game character A stands in front of the game character B. If this reading interval is greater than 5 seconds and less than 10 seconds, the game character B stands in front of the game character A. If this read interval exceeds 10 seconds and is less than 20 seconds, the game characters A and B stand side by side.

Step 302: presenting a holographic projection corresponding to the fused image content.

In addition, in order to improve an initiative of users to continuously acquire the near field communication information memory in which new image content configuration information is stored, a holographic projection corresponding to default image content configuration information may be presented in a case that the above execution body (for example, the holographic projection body 101 as shown in FIG. 1) fails to read the image content configuration information for a prese time period (that is, the near field communication information memory 102 in which the image content configuration information is stored is not within the near field communication distance), and the holographic projection corresponding to the image content configuration information read from a previous near field communication information memory 102 is not further presented.

For example, a user X previously obtained a bottle cap N, in which the image content configuration information of the game character A is recorded, from a certain print of a limited edition, and by placing it next to an intelligent loudspeaker box supporting holographic projection, used the intelligent loudspeaker box to read out a link for obtaining the image content of the game character A from the bottle cap N through a near communication technology. The intelligent field loudspeaker box downloads the image content of the game character A from a storage server according to the link, and controls a functional component of holographic projection to present the holographic projection of the game character A.

However, the bottle cap N is inadvertently dropped by a user Y on a later day, and the intelligent sound box does not continuously detect the bottle cap N within the near field communication distance for a week, then the holographic projection of the game character A is no longer presented, and in turn, the holographic projection of a default character C is presented.

Further, in order to prevent users from tampering with local data of the intelligent sound box by illegal means to present image content configuration information stored in a non-existent near field communication information memory by modifying default image content data, it is possible to set the intelligent sound box to delete the image content data of the game character A previously read by itself after a week, or to set a data writing permission of the intelligent sound box for a specific user.

As an implementation of the method shown in FIG. 3, the present disclosure also provides, through FIG. 4, an embodiment of an apparatus for processing a holographic projection image, which corresponds to the method embodiment shown in FIG. 3, and which is particularly applicable to various electronic devices.

As shown in FIG. 4, the apparatus 400 for processing a holographic projection image of the present embodiment may include an image fusing unit 401 and a holographic projection presenting unit 402. The image fusing unit 401 is configured to, in response to reading a plurality of different pieces of image content configuration information within a preset time period, fuse image content corresponding to the different pieces of image content configuration information to obtain fused image content. The holographic projection presenting unit 402 is configured to present a holographic projection corresponding to the fused image content.

In the present embodiment, in the apparatus 400 for processing a holographic projection image, the detailed processing of the image fusing unit 401 and the holographic projection presenting unit 402 and the technical effects thereof may be described with reference to the related description of step 301-302 in the corresponding embodiment in FIG. 3, and details are not described herein again.

In some optional implementations of the present embodiment, the apparatus 400 for processing a holographic projection image may further include:

a failure recovery default unit configured to present a holographic projection corresponding to default image content configuration information in response to failing to read the image content configuration information for a continuous preset time period.

According to an embodiment of the present disclosure, the present disclosure further provides an electronic device, including: at least one processor; and a memory communicatively connected to the at least one processor; where the memory stores instructions executable by the at least one processor, and the instructions are executed by the at least one processor, such that the at least one processor can implement the method for processing a holographic projection image according to any one of the above embodiments when executed.

According to an embodiment of the present disclosure, the present disclosure further provides a readable storage medium storing computer instructions, where the computer instructions are used for causing a computer to implement the method for processing a holographic projection image according to any one of the above embodiments when executed.

Embodiments of the present disclosure provide a computer program product that, when executed by a processor, enables the method for processing a holographic projection image described in any of the above embodiments.

FIG. 5 illustrates a schematic block diagram of an exemplary electronic device 500 that may be used to implement embodiments of the present disclosure. The electronic device is intended to represent various forms of digital computers, such as a laptop computer, a desktop computer, a workbench, a personal digital assistant, a server, a blade server, a mainframe computer, and other suitable computers. The electronic device may further represent various forms of mobile apparatuses, such as a personal digital assistant, a cellular phone, a smart phone, a wearable device, and other similar computing apparatuses. The components shown herein, the connections and relationships thereof, and the functions thereof are used as examples only, and are not intended to limit implementations of the present disclosure described and/or claimed herein.

As shown in FIG. 5, the device 500 includes a computing unit 501, which may perform various appropriate actions and processes according to a computer program stored in a read-only memory (ROM) 502 or a computer program loaded into a random access memory (RAM) 503 from a storage unit 508. In RAM 503, various programs and data required for operation of the device 500 may also be stored. The calculation units 501, ROM 502 and RAM 503 are connected to each other via a bus 504. An input/output (I/O) interface 505 is also connected to bus 504.

A plurality of components in the device 500 are connected to the I/O interface 505, including an input unit 506, such as a keyboard, a mouse, and the like; an output unit 507, for example, various types of displays, speakers, and the like; A storage unit 508, such as a magnetic disk, an optical disk, or the like; and a communication unit 509, such as a network card, a modem, or a wireless communication transceiver. The communication unit 509 allows the device 500 to exchange information/data with other devices over a computer network such as the Internet and/or various telecommunications networks.

The computing unit 501 may be various general-purpose and/or special-purpose processing components having processing and computing capabilities. Some examples of computing units 501 include, but are not limited to, central processing units (CPUs), graphics processing units (GPUs), various specialized artificial intelligence (AI) computing chips, various computing units running machine learning model algorithms, digital signal processors (DSPs), and any suitable processors, controllers, microcontrollers, and the like. The calculation unit 501 performs various methods and processes described above, such as a method for processing a holographic projection image. For example, in some embodiments, the method for processing a holographic projection image may be implemented as a computer software program tangibly embodied in a machine-readable medium, such as a storage unit 508. In some embodiments, some or all of the computer program may be loaded and/or installed on the device 500 via the ROM 502 and/or the communication unit 509. When the computer program is loaded into the RAM 503 and executed by the calculation unit 501, one or more steps of the method for processing a holographic projection image described above may be performed. Alternatively, in other embodiments, the computing unit 501 may be configured to perform a method for processing a holographic projection image by any other suitable means (e.g., by means of firmware).

The various embodiments of the systems and techniques described above herein may be implemented in a digital electronic circuit system, an integrated circuit system, a field programmable gate array (FPGA), an application specific integrated circuit (ASIC), a special purpose standard product (ASSP), a system on a system on a chip (SOC), a load programmable logic device (CPLD), computer hardware, firmware, software, and/or combinations thereof. These various embodiments may include being implemented in one or more computer programs that may execute and/or interpret on a programmable system including at least one programmable processor, which may be a dedicated or general purpose programmable processor, may receive data and instructions from a memory system, at least one input device, and at least one output device, and transmit the data and instructions to the memory system, the at least one input device, and the at least one output device.

The program code for carrying out the methods of the present disclosure may be written in any combination of one or more programming languages. These program codes may be provided to a processor or controller of a general purpose computer, special purpose computer, or other programmable data processing apparatus such that the program code, when executed by the processor or controller, causes the functions/operations specified in the flowchart and/or block diagram to be implemented. The program code may be executed entirely on the machine, partly on the machine, partly on the machine as a stand-alone software package and partly on the remote machine or entirely on the remote machine or server.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, devices, or devices, or any suitable combination of the foregoing. More specific examples of machine-readable storage media may include one or more line-based electrical connections, portable computer disks, hard disks, random access memory (RAM), read-only memory (ROM), erasable programmable read-only memory (EPROM or flash memory), optical fibers, portable compact disk read-only memory (CD-ROM), optical storage devices, magnetic storage devices, or any suitable combination of the above.

To provide interaction with a user, the systems and techniques described herein may be implemented on a computer having a display device (e.g., a CRT (cathode ray tube) or LCD (liquid crystal display) monitor) for displaying information to the user; And a keyboard and a pointing device (e.g., a mouse or a trackball) through which a user can provide input to a computer. Other types of devices may also be used to provide interaction with a user; For example, the feedback provided to the user may be any form of sensory feedback (e.g., visual feedback, auditory feedback, or tactile feedback); And input from the user may be received in any form, including acoustic input, speech input, or tactile input.

The systems and techniques described herein may be implemented in a computing system including a background component (e.g., as a data server), or a computing system including a middleware component (e.g., an application server), or a computing system including a front-end component (e.g., a user computer having a graphical user interface or a web browser through which a user may y interact with embodiments of the systems and techniques described herein), or a computing system including any combination of such background component, middleware component, or front-end component. The components of the system may be interconnected by any form or medium of digital data communication (e.g., a communication network). Examples of communication networks include a local area network (LAN), a wide area network (WAN), and the Internet.

The computer system may include a client and a server. The client and server are typically remote from each other and typically interact through a communication network. The relationship between the client and the server is generated by a computer program running on the corresponding computer and having a client-server relationship with each other. The server may be a cloud server, which is also referred to as a cloud computing server or a cloud host, and is a host product in a cloud computing service system, so as to solve a defect that a conventional physical host and a VPS (Virtual Private Server) service are difficult to manage and have weak service scalability.

It should be understood that the various forms of processes shown above may be used to reorder, add, or delete steps. For example, the steps disclosed in the present disclosure may be executed in parallel, sequentially, or in different orders, as long as the desired results of the technical solutions provided in the present disclosure can be implemented. This is not limited herein.

The above specific implementations do not constitute any limitation to the scope of protection of the present disclosure. It should be understood by those skilled in the art that various modifications, combinations, sub-combinations, and replacements may be made according to the design requirements and other factors. Any modification, equivalent replacement, improvement, and the like made within the spirit and principle of the present disclosure should be encompassed within the scope of protection of the present disclosure.

What is claimed is:

1. A holographic projection system comprising:
   a near field communication information storage, for storing image content configuration information readable by a near field communication mechanism, and storing a link for querying image content configuration information in an image content storage server, wherein the image content configuration information comprises a three-dimensional structure and a color distribution of an object;
   a holographic projection body provided with a near field communication scanner, for reading the link, and reading the image content configuration information in the near field communication information memory through the near field communication scanner and presenting a holographic projection corresponding to the image content configuration information; and
   the image content storage server communicatively connected with the holographic projection, for returning target image content configuration information corresponding to the link according to the link for querying image content configuration information in the image content storage server.

2. The holographic projection system according to claim 1, wherein the near field communication information memory is a near field communication chip in which the image content configuration information is stored.

3. The holographic projection system of claim 2, wherein the near field communication chip is embedded in a medal, a badge, a card, or a bottle cap.

4. The holographic projection system according to claim 3, wherein the holographic projection body is provided with an opening for holding, accommodating, or wrapping the near field communication information memory, the opening having a shape corresponding to a shape of a carrier embedded with the near field communication information memory.

5. The holographic projection system according to claim 3, wherein the near field communication information storage is magnetically attached to an outer surface of the holographic projection body.

6. The holographic projection system according to claim 3, wherein a shielding storage box is provided on the holographic projection body, for blocking the near field communication scanner from reading the image content configuration information stored in the near field communication information memory inside the shielding storage box.

7. The holographic projection system according to claim 2, wherein the holographic projection body is provided with an opening for holding, accommodating, or wrapping the near field communication information memory, the opening having a shape corresponding to a shape of a carrier embedded with the near field communication information memory.

8. The holographic projection system according to claim 2, wherein the near field communication information storage is magnetically attached to an outer surface of the holographic projection body.

9. The holographic projection system according to claim 2, wherein a shielding storage box is provided on the holographic projection body, for blocking the near field communication scanner from reading the image content configuration information stored in the near field communication information memory inside the shielding storage box.

10. The holographic projection system according to claim 1, wherein the holographic projection body is provided with an opening for holding, accommodating, or wrapping the near field communication information memory, the opening having a shape corresponding to a shape of a carrier embedded with the near field communication information memory.

11. The holographic projection system according to claim 10, wherein the near field communication information storage is magnetically attached to an outer surface of the holographic projection body.

12. The holographic projection system according to claim 1, wherein the near field communication information storage is magnetically attached to an outer surface of the holographic projection body.

13. The holographic projection system according to claim 1, wherein a shielding storage box is provided on the holographic projection body, for blocking the near field communication scanner from reading the image content configuration information stored in the near field communication information memory inside the shielding storage box.

* * * * *